United States Patent
Sayeed et al.

(10) Patent No.: US 9,686,701 B2
(45) Date of Patent: Jun. 20, 2017

(54) METHOD AND APPARATUS FOR TARGET CELL THROUGHPUT PREDICTION PRIOR TO HANDOVER OF A USER EQUIPMENT

(71) Applicant: Alcatel-Lucent USA Inc., Murray Hill, NJ (US)

(72) Inventors: Zulfiquar Sayeed, Highstown, NJ (US); Raymond Miller, Belmar, NJ (US); Rayyan Sayeed, Highstown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/725,553

(22) Filed: May 29, 2015

(65) Prior Publication Data
US 2016/0353299 A1   Dec. 1, 2016

(51) Int. Cl.
| H04W 36/00 | (2009.01) |
| H04W 24/08 | (2009.01) |
| H04W 36/30 | (2009.01) |
| H04L 5/00  | (2006.01) |
| H04W 80/06 | (2009.01) |

(52) U.S. Cl.
CPC ............. *H04W 24/08* (2013.01); *H04L 5/00* (2013.01); *H04W 36/30* (2013.01); *H04W 80/06* (2013.01)

(58) Field of Classification Search
CPC ..... H04W 36/30; H04W 36/18; H04W 36/12; H04W 80/04
USPC .......................... 455/437, 436, 439; 370/331
See application file for complete search history.

(56) References Cited

U.S. PATENT DOCUMENTS

| 6,978,137 B2* | 12/2005 | Gwon ............... H04W 36/0016 370/331 |
| 2002/0187784 A1* | 12/2002 | Tigerstedt ......... H04W 36/0088 455/439 |
| 2003/0119550 A1* | 6/2003 | Rinne .................. H04W 36/30 455/553.1 |
| 2007/0097924 A1* | 5/2007 | Martinovich ......... H04W 36/30 370/332 |
| 2008/0004020 A1* | 1/2008 | Yasuda ............. H04W 36/0083 455/436 |
| 2009/0080382 A1* | 3/2009 | Chen ................. H04W 36/0016 370/331 |

(Continued)

OTHER PUBLICATIONS

Huaining Ge et al., "A History-Based Handover Prediction for LTE Systems", 2009, School of Communication & Information Engineering, pp. 1-4.

(Continued)

*Primary Examiner* — Danh Le
(74) *Attorney, Agent, or Firm* — Harness, Dickey & Pierce, P.L.C.

(57) ABSTRACT

In one example embodiment, a user equipment is currently being served over a first component carrier. The user equipment includes a processor configured to predict a quality of a pilot signal associated with a second component carrier, the second component carrier being a potential component carrier for a handover of the user equipment, and predict a data throughput based on the predicted quality of the pilot signal, the predicted data throughput being indicative of data throughput experienced by the user equipment after the handover of the user equipment to the second component carrier.

18 Claims, 4 Drawing Sheets

(56) References Cited

U.S. PATENT DOCUMENTS

| | | | | |
|---|---|---|---|---|
| 2009/0310562 | A1* | 12/2009 | Medapalli | H04W 36/14 370/331 |
| 2012/0020325 | A1* | 1/2012 | Swamy | H04W 36/14 370/331 |
| 2014/0349656 | A1* | 11/2014 | Sfar | H04W 36/0088 455/437 |
| 2016/0037533 | A1* | 2/2016 | Lee | H04W 36/22 370/236 |

OTHER PUBLICATIONS

Sang-Jo Yoo et al., "Predictive Handover Mechanism based on Required Time Estimation in Heterogeneous Wireless Networks", 2008 IEEE, pp. 1-7.

Bernard Sklar, "Rayleigh Fading Channels in Mobile Digital Communication Systems Part 1: Characterization", Jul. 1997, IEEE, IEEE Communications Magazine, pp. 90-100.

Konstantinos Dimou et al., "Handover within 3GPP LTE: Design Principles and Performance", 2009 IEEE, pp. 1-5.

Péter Tarján et al., "Buffer Overflow Probability of TCP Flows During Mobile Handovers", Jul. 2008, IEEE Communications Letters, vol. 12, No. 7, pp. 481-483.

Marilynn P. Wylie-Green et al., "Throughput, Capacity, Handover and Latency Performance in a 3GPP LTE FDD Field Trial", IEEE Communications Society, 2010, pp. 1-6.

Sushruth N. Donthi et al., "An Accurate Model for EESM and its Application to Analysis pf CQI Feedback Schemes and Scheduling in LTE", IEEE Transactions on Wireless Communications, vol. 10, No. 10, Oct. 2011, pp. 3436-3448.

Andrei Gurtov, "Effect of Delays on TCP Performance", Cellular Systems Development, pp. 1-18.

Federico Boccardi et al., "Five Disruptive Technology Directions for 5G", 5G Wireless Communication Systems, Feb. 2014, IEEE Communications Magazine, pp. 74-80.

Sergey N. Moiseev et al., "Prediction of the SINR RMS in the IEEE 802.16 OFDMA System", IEEE Transactions on Signal Processing, vol. 57, No. 8, Aug. 2009. pp. 2903-2907.

Adrian W. Bowman et al., "Applied Smoothing Techniques for Data Analysis", Oxford Statistical Science Series, Oxford Science Publications, pp. 1-2.

3rd Generation Partnership Project; Technical Specification Group Radio Access Network; Evolved Universal Terrestrial Radio Access (E-UTRA); Requirements for support of radio resource management (Release 9), 3GPP TS36.133 V9.0.0, May 2009, pp. 1-259.

3rd Generation Partnership Project; Technical Specifircation Group Radio Access Network; High Speed Downlink Packet Access: UE Radio Transmission and Reception (FDD) (Release 5), 3GPP TR 25.890 V1.0.0, May 2002, pp. 1-25.

* cited by examiner

METHOD AND APPARATUS FOR TARGET CELL THROUGHPUT PREDICTION PRIOR TO HANDOVER OF A USER EQUIPMENT

BACKGROUND

In wireless communications, a handover of a user equipment (UE) such as a mobile device occurs when a link quality of one cell signal between the UE and a serving base station decreases and/or a link quality of another cell signal between the UE and possible target cell(s) increases. A possible target cell may be the same carrier frequency provided by different base station than the serving base station, a different component carrier (i.e. different carrier frequency) of the serving or different base station, or a different radio access technology of the serving or different base station. The loss in link quality of the cell signal between the UE and the serving base station may be due to various factors such as path loss, slow fading, fast fading, noise, etc.

Interactions between the various factors that cause a decline in the link quality of the cell signal between the UE and the base station complicates a handover of the UE (e.g., from one component carrier to another component carrier and/or from the serving base station to the target base station) at a point of handover, such that the UE will experience interruption in services. For example, an application server (e.g., a YouTube server) and/or the Transport Control Protocol (TCP) stack have no knowledge of the state of the network in which the UE operates (e.g., Long Term Evolution (LTE) network), where the state of the network is indicative of how much throughput or bandwidth is available for the UE. Disruption at the TCP layer leads to server application layer rate loss, spurious re-transmissions, duplicate acknowledgement (ACK) reception, slow start, etc., which negatively impact (cause interruptions in services) the experience of a user at the UE during a handover process in which the serving of the UE is transferred from the serving base station to the target base station.

SUMMARY

In one example embodiment, a user equipment is currently being served over a first component carrier. The user equipment includes a processor configured to predict a quality of a pilot signal associated with a second component carrier, the second component carrier being a potential component carrier for a handover of the user equipment, and predict a data throughput based on the predicted quality of the pilot signal, the predicted data throughput being indicative of data throughput experienced by the user equipment after the handover of the user equipment to the second component carrier.

In yet another example embodiment, the processor is configured to predict the quality of the pilot signal based on a power and a strength indicator of the pilot signal.

In yet another example embodiment, the processor is configured to predict the quality of the pilot signal by measuring two or more qualities of the pilot signal, each of the two or more qualities being measured during a single transmission time period, applying at least one correction process to the measured two or more qualities of the pilot signal, and predicting the quality of the pilot signal based on the two or more qualities of the pilot signal to which the at least one correction process has been applied.

In yet another example embodiment, the processor is configured to obtain a mapping associated with the second component carrier, the mapping representing the data throughput of the second component carrier as a function of a quality of the pilot signal, and input the predicted quality of the pilot signal into the mapping, wherein the processor is configured to predict the data throughput based on the mapping.

In yet another example embodiment, the processor is configured to predict a plurality of qualities of the pilot signal, predict a plurality of data throughputs based on the plurality of qualities of the pilot signal, and apply a correction process to the predicted plurality of data throughputs to adjust variations among the predicted plurality of data throughputs.

In yet another example embodiment, the mapping is created based on a received quality of the pilot signal, as measured by one or more user equipment served over the second component carrier, a transport block size determined for each of the one or more user equipment served over the second component carrier during a transmission time period, and a number of physical resource blocks allocated to each of the one or more user equipment served over the second component carrier during the transmission period.

In yet another example embodiment, the mapping is created in a laboratory setting and pre-programmed into a base station to be obtained by the user equipment.

In yet another example embodiment, the mapping has been created by the user equipment during one or more previous operations of the user equipment over the second component carrier, and the mapping has been stored in a memory of the user equipment.

In yet another example embodiment, the processor is configured to determine whether the user equipment is in a region of handover to two or more component carriers, and if the processor determines that the user equipment is in the region of handover to the two or more component carriers, the processor is configured to predict a quality of a pilot signal associated with each of the two or more component carriers, predict a data throughput for each of the two or more component carriers based on the predicted quality of the respective pilot signal, the predicted data throughput for each of the two or more component carriers being indicative of data throughput after the handover of the user equipment to the respective one of the two or more component carriers, and select one of the two or more component carriers having the highest predicted data throughput for handover.

In yet another example embodiment, the processor is further configured to communicate the predicted data throughput to one of an application server or a transmission control protocol (TCP) transmission entity.

In yet another example embodiment, the first and second component carriers are provided by the base station, associated with a single frequency band or multiple frequency bands, and associated with different wireless communications technologies. The handover is between the first and second component carriers within a single sector of a cell served by the base station, or the first and second component carriers in adjacent sectors of the cell served by the base station. The user equipment is configured to operate according to any one of the different wireless communications technologies.

In yet another example embodiment, the first and second component carriers are provided by different base stations, associated with a single frequency band or different frequency bands, and associated with different wireless communications technologies. The handover is between two adjacent cells, each of the two adjacent cells being serviced by one of the different base stations. The user equipment is configured to operate according to any one of the different wireless communications technologies.

In one example embodiment, a method for a handover of a user equipment currently served over a first component carrier includes predicting, by the user equipment, a quality of a pilot signal associated with a second component carrier, the second component being a potential component carrier for the handover of the user equipment, and predicting a data throughput based on the predicted quality of the pilot signal, the predicted data throughput being indicative of data throughput experienced by the user equipment after the handover of the user equipment to the second component carrier.

In yet another example embodiment, the predicting the quality of the pilot signal predicts the quality of the pilot signal based on a power and a strength indicator of the pilot signal.

In yet another example embodiment, the predicting predicts the quality of the pilot signal by measuring two or more qualities of the pilot signal, each of the two or more qualities being measured during a single transmission time period, applying at least one correction process to the measured two or more qualities of the pilot signal, and predicting the quality of the pilot signal based on the two or more qualities of the pilot signal to which the at least one correction process has been applied.

In yet another example embodiment, the method further includes obtaining a mapping associated with the second component carrier, the mapping representing the data throughput of the second component carrier as a function of a quality of the pilot signal, and inputting the predicted quality of the pilot signal into the mapping for predicting the data throughput, wherein the predicting the data throughput predicts the data throughput based on the mapping.

In yet another example embodiment, the method further includes creating the mapping based on a received quality of the pilot signal, as measured by one or more user equipment served over the second component carrier, a transport block size determined for each of the one or more user equipment served over the second component carrier during a transmission time period, and a number of physical resource blocks allocated to each of the one or more user equipment served over the second component carrier during the transmission time period, and providing the mapping to be obtained by the user equipment.

In yet another example embodiment, the mapping has been created by the user equipment during one or more previous operations of the user equipment over the second component carrier, and the mapping has been stored in a memory of the user equipment.

In yet another example embodiment, the method further includes determining whether the user equipment is in a region of handover to two or more component carriers, and, upon determining that the user equipment is in the region of handover to the two or more component carriers, predicting a quality of a pilot signal associated with each of the two or more component carriers, predicting a data throughput for each of the two or more component carriers based on the predicted quality of the respective pilot signal, the predicted data throughput for each of the two or more component carriers being indicative of data throughput after the handover of the user equipment to the respective one of the two or more component carriers, and selecting one of the two or more component carriers having the highest predicted data throughput for handover.

In yet another example embodiment, the method further includes communicating the predicted data throughput to one of an application server or a transmission control protocol (TCP) transmission entity.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
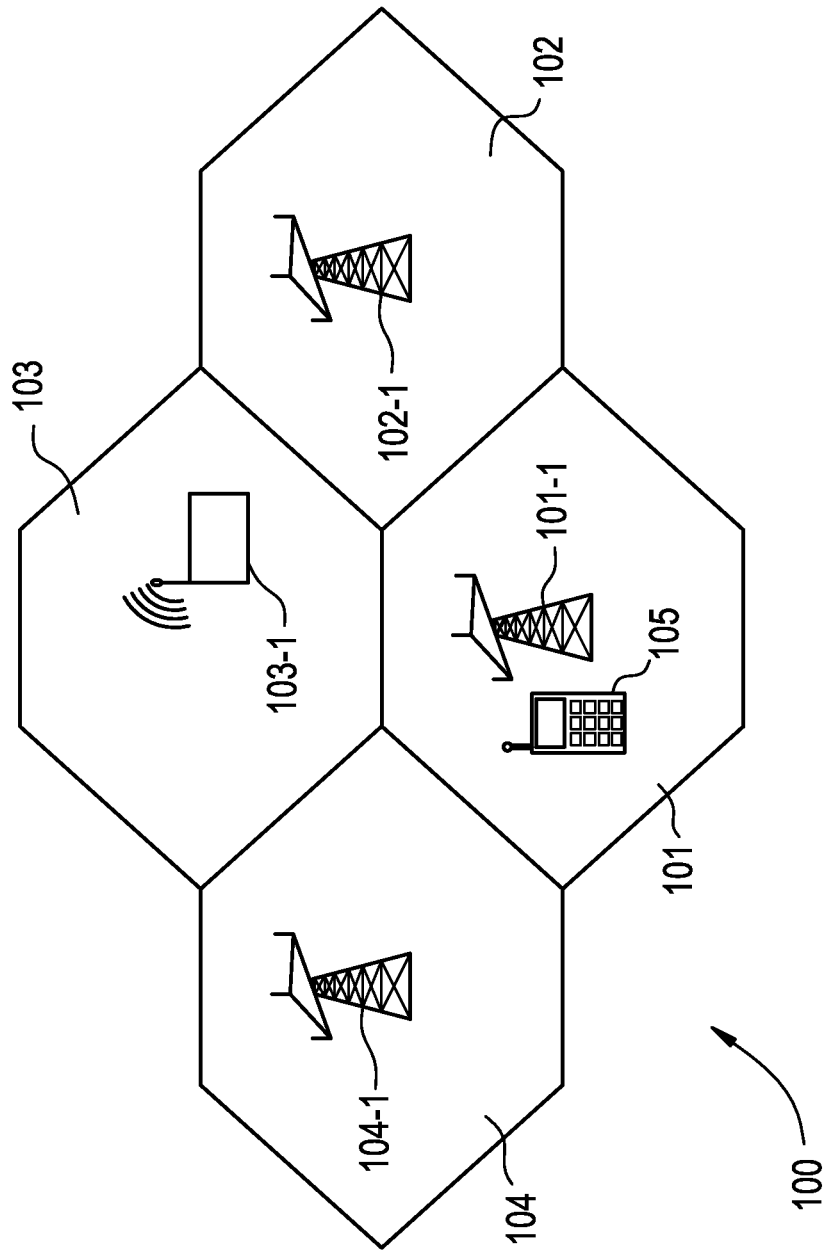
FIG. 1 illustrates a communications network, according to one example embodiment.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF EXAMPLE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing small wireless cells, base stations, NodeBs, user equipments (UEs) including low cost machine type communication (LC-MTC) UEs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), macro cell, etc., and describes a device in communication with and providing wireless resources to UEs in a geographical coverage area. As discussed herein, eNBs may have all functionally associated with conventional, well-known base stations in addition to the capability and functionality discussed herein.

As used herein, the term "small wireless cell" may be considered synonymous to, and may hereafter be occasionally referred to as a micro cell, pico cell, Home NodeB (HNB), Home eNodeB (HeNB), etc., and describes a device in communication with and providing wireless resources (e.g., LTE, 3G, WiFi, etc.) to users in a geographical coverage area that is, in most cases, smaller than the geographical coverage area covered by a macro eNB or cell. As discussed herein, small wireless cells may have all functionally associated with conventional, well-known base stations in addition to the capability and functionality discussed herein. In this regard, the small wireless cells may include a base station or eNB. Small wireless cells according to at least some example embodiments may also serve as WLAN (or WiFi) access points (APs) providing WLAN (or WiFi) resources for devices within range of the small wireless cell. Although discussed with regard to macro eNBs, example embodiments may also be applicable to small wireless cells and base stations.

Generally, as discussed herein, a small wireless cell may be any well-known small wireless cell including one or more processors, various communication interfaces (e.g., LTE, WiFi and wired), a computer readable medium, memories, etc. The one or more interfaces may be configured to transmit/receive data signals via wireless connections over a WiFi and a cellular network to/from one or more other devices, and also communicate with the Internet, for example over a wired connection.

The term "user equipment" or "UE", as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a 3$^{rd}$ Generation Partnership Project Long-Term Evolution (3GPP LTE) network).

According to example embodiments, UEs, small wireless base stations (or cells), eNBs, etc. may be (or include) hardware, firmware, hardware executing software, or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs), computers, or the like, configured as special purpose machines to perform the functions described herein as well as any other well-known functions of these elements. In at least some cases, CPUs, SOCs, DSPs, ASICs and FPGAs may collectively be referred to as processing circuits, processors and/or microprocessors.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and 3$^{rd}$ Generation Partnership Project LTE (3GPP LTE).

Throughout the present disclosure, a handover may refer to a process according to which a UE such as a mobile device is handed off from one component carrier to another component carrier, where a component carrier is defined as a uniquely attachable and identifiable non-contiguous or contiguous radio frequency band. For example, in a cell serviced by a long-term evolution (LTE) eNodeB, the eNodeB may currently service a UE over a first carrier component (e.g., a frequency band with a 700 MHz center frequency). The eNodeB may then hand off the UE (due to for example loss of link quality of the cell signal between the eNodeB and the UE over the first carrier component) to the same component carrier in a different sector or a second carrier component (e.g., a frequency band with a 2100 MHz center frequency) in the same or different sector. That is, said hand off of the UE from the first component carrier to the second component carrier may be within the same sector of the cell serviced by the eNodeB, different/adjacent sectors of the same cell serviced by the eNodeB, between adjacent cells served by different base stations, and/or cells of different technologies. The first and second component carriers may be associated with different cellular technologies (e.g., 3G and 4G LTE technologies, LTE and CDMA technologies etc.). The first and second component carriers may be within the same frequency band or different frequency bands. Also, the first and second component carriers and a hand off of a UE there between may constitute any combination/permutation of the first and second component carriers, as defined above. Terms such as carrier, cell, and sector may be used interchangeably throughout the disclosure and refer to the component carrier as defined above.

For illustrative purposes, in the example embodiments described hereinafter, it is assumed that an eNodeB of a first cell (which may also be referred to as a serving base station) is currently serving a UE over a given component carrier. Furthermore, it is assumed that the UE is to be handed off to a base station of another cell (which may be referred to as a target base station) and the target base station is to service the UE over a second component carrier. In other words, in the example embodiments described below, the first and second component carriers are assumed to belong to different geographical cells serviced by different/separate base stations.

Nevertheless, a person having ordinary skills in the art will readily appreciate that the example embodiments may easily be modified to be applicable to scenarios in which the first and second component carriers do not necessarily belong to different geographical cells serviced by different/separate base stations but may rather include any of the definitions of the first and second component carriers, as provided above.

FIG. 1 illustrates a communication network, according to one example embodiment. As shown in FIG. 1, a communications network 100 may include a plurality of cells 101-104, each of which may be served by a base station. For example, base station 101-1 serves cell 101, base station 102-1 serves cell 102, base stations 103-1 serves cell 103 and base stations 104-1 serves cell 104.

The communications network 100 may be a heterogeneous network, in which each of the cells 101-1-4 and their corresponding base stations operate based on different wireless communications technologies. For example, in cell 101, the base station 101-1 may be an LTE eNB, while the base station 102-1 of cell 102 is a GSM based base transceiver station (BTS). Furthermore, cell 103 may be a small wireless cell serviced by a WiFi router 103-1 that establishes connections between the devices in cell 103 and a wide local area network (WLAN). Finally, cell 104 may be a small cell (pico cell, femto cell, etc.) served by a corresponding small cell base station 104-1. Examples of different technologies within a heterogeneous network may further include 2G, 3G, 4G, CDMA, as well as any other available or to be developed wireless communications technologies.

Alternatively, the communications network 100 may be a homogeneous network in which cells 101-104 and their corresponding base stations 101-1 to 104-1 are based on the same technology (e.g., LTE based network).

The communications network 100 may further include a UE 105, which may be a device as described above and/or any other device capable of establishing wireless communication with other network components, including but not limited to, a laptop, a tablet, a personal digital assistant (PDA), etc. In the example embodiment shown in FIG. 1, the UE 105 is shown to be currently in cell 101 (UE 105 is currently camping on cell 101) and being served by the currently serving base station 101-1 over a first component carrier.

Furthermore and while not shown in FIG. 1, the communications network 100 may include other components that are necessary for establishing communication based on the underlying technology, as is known. For example, assuming that the communications network 100 is based on LTE technology, then the communications network 100 may further include components such as an evolved packet core (EPC), which may also be referred to as the core network.

While a specific number of cells, base stations, and a single UE are illustrated in FIG. 1, example embodiments are not limited to that shown in FIG. 1 but may include any number of cells, base stations, and UEs.

Hereinafter, example embodiments will be described with respect to a LTE-based communications system and the signaling/protocols associated with LTE-based communication, as defined in the standard (i.e., as defined in 3GPP LTE). However, the LTE defined communications protocols and signaling described herein may be easily modified by a person having ordinary skill in the art to be applicable to other technologies.

Figure 2:
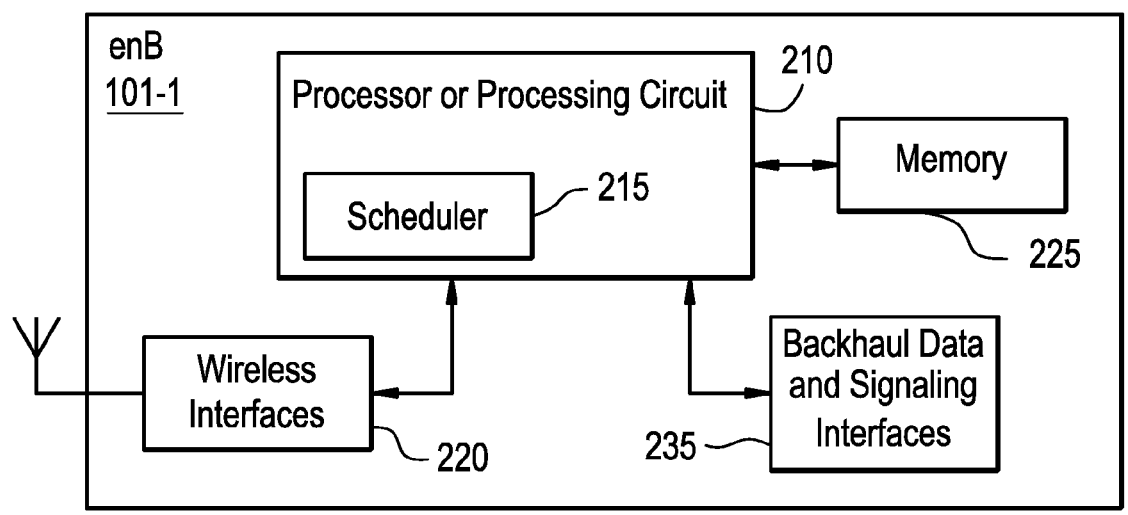
FIG. 2 illustrates an eNodeB (eNB) shown in FIG. 1, according to one example embodiment.

FIG. 2 illustrates an eNB shown in FIG. 1, according to one example embodiment.

Referring to FIG. 2, the eNB 101-1 includes: a memory 225; a processor 210; a scheduler 215; wireless communication interfaces 220; and a backhaul data and signaling interfaces (referred to herein as backhaul interface) 235. The processor or processing circuit 210 controls the function of eNB 101-1 (as described herein), and is operatively coupled to the memory 225 and the communication interfaces 220. While only one processor 210 is shown in FIG. 2, it should be understood that multiple processors may be included in a typical eNB, such as the eNB 101-1. The functions performed by the processor may be implemented using hardware. As discussed above, such hardware may include one or more Central Processing Units (CPUs), digital signal processors (DSPs), application-specific-integrated-circuits, field programmable gate arrays (FPGAs) computers or the like. The term processor or processing circuit, used throughout this document, may refer to any of these example implementations, though the term is not limited to these examples.

Still referring to FIG. 2, the wireless communication interfaces 220 (also referred to as communication interfaces 220) include various interfaces including one or more transmitters/receivers (or transceivers) connected to one or more antennas to wirelessly transmit/receive control and data signals to/from the UE 105, or via a control plane.

The backhaul interface 235 interfaces with other components of the communications network 100 such a serving gateway, a mobility management entity, other eNBs, or other EPC network elements and/or radio access network elements within the communications network 100.

The memory 225 may buffer and store data that is being processed at eNB 105, transmitted and received to and from eNB 101-1.

Still referring to FIG. 2, the scheduler 215 schedules control and data communications that are to be transmitted and received by the eNB 101-1 to and from the UE 105.

Figure 3:
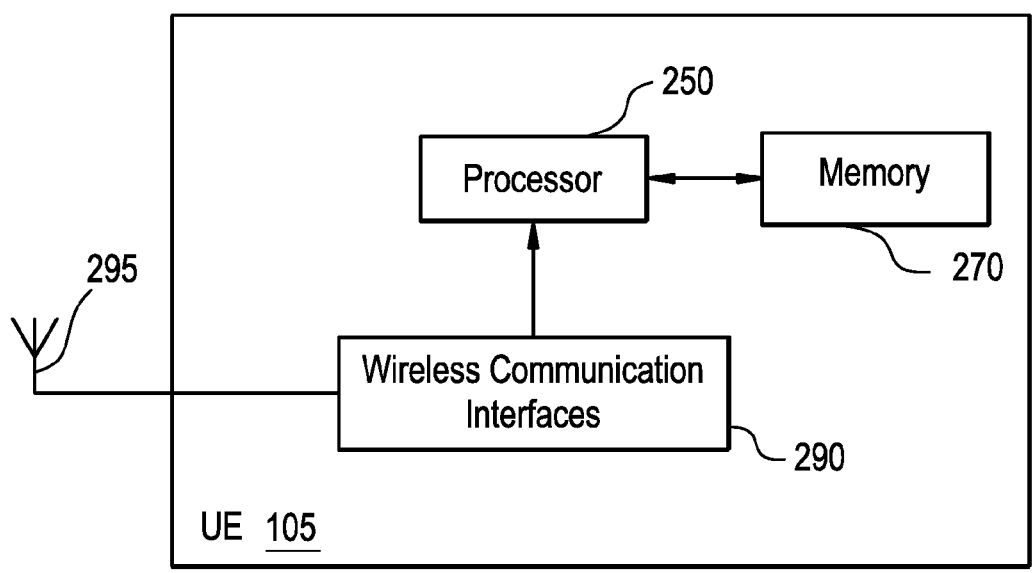
FIG. 3 illustrates a user equipment (UE) shown in FIG. 1, according to one example embodiment.

FIG. 3 illustrates a UE shown in FIG. 1, according to one example embodiment.

Referring to FIG. 3, the UE 105 includes: a memory 270; a processor (or processing circuit) 250 connected to the memory 270; various interfaces 290 connected to the processor 250; and an antenna 295 connected to the various interfaces 290. The various interfaces 290 and the antenna 295 may constitute a transceiver for transmitting/receiving data from/to the eNB 101-1. As will be appreciated, depending on the implementation, the UE 105 may include many more components than those shown in FIG. 3. However, it is not necessary that all of these generally conventional components be shown in order to disclose the illustrative example embodiment.

The memory 270 may be a computer readable storage medium that generally includes a random access memory (RAM), read only memory (ROM), and/or a permanent mass storage device, such as a disk drive. The memory 270 also stores an operating system and any other routines/modules/applications for providing the functionalities of the UE 105 (e.g., functionalities of a UE, methods according to the example embodiments, etc.) to be executed by the processor 250. These software components may also be loaded from a separate computer readable storage medium into the memory 270 using a drive mechanism (not shown). Such separate computer readable storage medium may include a disc, tape, DVD/CD-ROM drive, memory card, or other like computer readable storage medium (not shown). In some embodiments, software components may be loaded into the memory 270 via one of the various interfaces 290, rather than via a computer readable storage medium.

The processor 250 may be configured to carry out instructions of a computer program by performing the arithmetical, logical, and input/output operations of the system. Instructions may be provided to the processor 250 by the memory 270.

The various interfaces 290 may include components that interface the processor 250 with the antenna 295, or other input/output components. As will be understood, the interfaces 290 and programs stored in the memory 270 to set forth the special purpose functionalities of the UE 105 will vary depending on the implementation of the UE 105.

A handover is a process in which a UE such as the UE 105 switches from one component carrier to another component carrier, as described above. For example, a handover is a process in which the UE 105 switches from a serving cell (e.g., cell 101 shown in FIG. 1 that currently serves the UE 105 over a first component carrier) to a target cell (e.g., any one of cells 102-104 shown in FIG. 1, which will service the UE 105 over a second component carrier). In other words, a handover is a process in which a UE such as the UE 105 switches from being served over a first component carrier to being served over a second component carrier. While the serving of the UE 105 over the first component carrier or the second component carrier may be performed by the same base station (e.g., eNB 101-1 of FIG. 1), in the example embodiments and for the sole purpose of illustrating the inventive concepts, the particular case of the first component carrier being provided by a currently serving base station (e.g., eNB 101-1 shown in FIG. 1) and the second component carrier being provided by a target base station of a target cell (e.g., any one of the base stations 102-1 to 104-1 of the cells 102-104, respectively, as shown in FIG. 1), is described.

When a UE is in a region of handover, the UE is capable of observing the pilot signal broadcasted by a neighboring cell base station (or the pilot signal transmitted by the serving base station over the second component carrier, when the first and second component carriers are provided by the same serving base station). In particular and in one example embodiment, the UE is capable of observing the neighboring cell's Reference Signal Received Power (RSRP) and Received Signal Strength Indicator (RSSI) (or the RSRP and RSSI of the serving base station over the second component carrier, when the first and second component carriers are provided by the same serving base station). Based on the RSSI and the RSRP, the UE will be able to measure the neighboring cell's Received Signal Received Quality (RSRQ) (or the RSRQ of the serving base station over the second component carrier, when the first and second component carriers are provided by the same serving base station). Thereafter, the UE predicts the neighboring cell's throughput (e.g., data throughput) (or the serving base station's throughput, when the first and second component carriers are provided by the same serving base station) for the UE using the RSRQ using a non-parametric functional regression technique, as will be described below.

The neighboring cell's predicted throughput (or the serving cell's throughput over a different (second) component carrier) is then communicated to the application server/client and/or TCP sender/receiver for adjusting throughput expectation so that the user of the UE experiences minimal disruption in services being received by the UE during the time in which the UE initiates and completes its handover process from a currently serving base station in a current cell to a target base station of a target (neighboring) cell. Furthermore, the neighboring cell's predicted throughput (or the serving cell's throughput over a different (second) component carrier) may be communicated to any other network element/application/entity which may utilize the neighboring cell's throughput in performing associated tasks.

Hereinafter the process of determining the RSRQ and predicting the neighboring cell's throughput will be described with reference to FIGS. 1 and 4. A neighboring cell may also be referred to as a target cell and a neighboring cell's throughput may refer to the throughput experienced by the UE once the UE switches to the neighboring/target cell and establishes connection to the Internet via the neighboring cell's base station. As mentioned above, the process described below with reference to FIGS. 1 and 4, may be modified to be applicable to scenarios in which the first and second component carriers are provided by the same base station (e.g., serving eNB 101-1) in the same sector of the cell 101, different sectors of the cell 101, etc.

Figure 4:
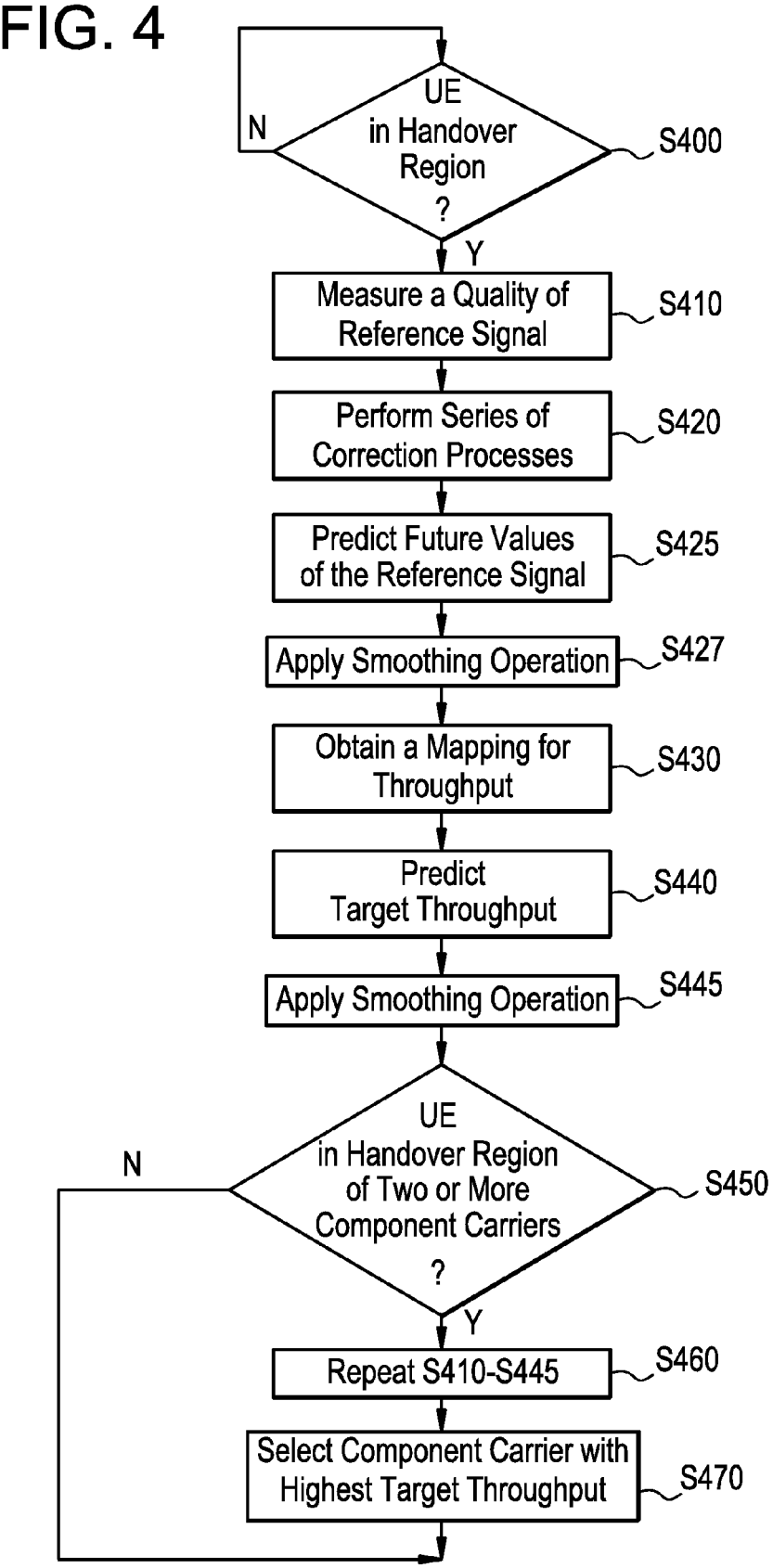
FIG. 4 describes a method of predicting a neighboring cell's throughput, according to one example embodiment.

FIG. 4 describes a method of predicting a neighboring cell's throughput, according to one example embodiment.

At S400, the UE 105 determines whether the UE 105 is in a handover region between the currently serving cell (e.g., cell 101) and another (target/neighboring) cell (e.g., cell 102) (or alternatively, in the handover region between different sectors of the same cell, different frequencies in the same cell, etc.). In other words, the UE 105 determines whether the UE 105 is in any one of a region within the cell 101, where the UE 105 determines whether it should switch from the currently serving base station to a target base station of any of the neighboring cells 102 to 104 (or alternatively to another sector within the cell 101, different component carrier in the same sector of the cell 101 as the one in which the UE 105 is currently served by the base station 101-1, etc.). A handover region may be close to a border between any two cells such as between cell 101 and cell 102, between cell 101 and cell 103, and between cell 101 and cell 104, between two sectors within the cell 101, between two component carriers in the same sector of the cell 101, etc.).

In one example embodiment, the UE 101 determines that the UE 101 is in a handover region, according to known methods (e.g., when a quality of a pilot signal broadcasted by a neighboring cell's base station such as base station 102-1 is stronger than a quality of a pilot signal broadcasted by the currently serving eNB 101-1 serving the UE 105, or alternatively, when a quality of a broadcasted pilot signal associated with one component carrier is stronger than a quality of a broadcasted pilot signal associated with a different component carrier).

If at S400, the UE 105 determines that the UE 105 is not in a handover region, the UE 105 may repeat S400 every given period of time (which may be a design parameter and determined based on empirical studies). Alternatively S400 may be triggered when a triggering event occurs. The triggering event may be, for example, when a RSSI and/or RSRP of the neighboring cell (or the RSSI and/or RSRP of the same cell over different component carriers), as observed by the UE 105, is stronger than a threshold (the threshold may be a design parameter that is configurable and set based on empirical studies).

However, if at S400, the UE 105 determines that the UE 105 is in the handover region, then at S410, the UE 105 measures a quality of the Reference Signal (RS) signal (pilot signal) transmitted by a neighboring/target cell's base station (e.g., one or more of the base stations 102-1 to 104-1). Furthermore and as described above, the UE 105 may measure the quality of the RS transmitted/broadcasted by the eNB 101-1 when eNB 101-1 provides the first and second component carriers). In one example embodiment, a pilot signal (e.g., RS) is associated with a component carrier when it forms/occupies at least one resource element in a given component carrier. For example, in LTE, a 5 MHz component carrier includes 25 resource blocks for user data transmission, each of which is formed of 84 resource elements. 1 resource element out of every 6 resource elements is dedicated as a pilot signal (e.g., RS). Accordingly, in the example embodiment of a 5 MHz component carrier of the LTE reference signal, several pilot signals (e.g., RSs) are dispersed throughout the resource blocks of the 5 MHZ component carrier. While a specific example of a relationship between pilot signals and component carriers describe one particular association of a pilot signal with a component carrier for LTE networks, the inventive concepts are not limited to this example embodiment.

Hereinafter and for ease of discussion, cell 102 is considered as the neighboring/target cell and the corresponding signals may be observed, measured and used by the UE 105 in predicting the neighboring/target cell's throughput. However, it will be understood that any one or more of the cells 102 to 104 may be considered as neighboring cells and their corresponding signals may be observed, measured and used by the UE 105 in predicting the throughput of the neighboring/target cell.

In one example embodiment, the UE 105 measures the RSRQ of the neighboring cell as follows.

For every set period of time, which may be identified by a transmission time index (TTI) the UE 105 observes the strength indicator and received power of the RS signal broadcasted by base station 102-1 of cell 102 (RSSI and RSRP of base station 102-1 or RSSI and RSRP of a different component carrier provided by the eNB 101-1). The UE 105 measures cell 102's RSRQ according to equation (1) shown below.

$$RSRQ_i = N * \frac{RSRP_i}{RSSI_i} \tag{1}$$

where i is the TTI index, $RSRQ_i$ is the RSRQ of cell 102 in the $i^{th}$ TTI, N is a number of physical resource blocks in the underlying technology's carrier (for example, in a 5 MHz LTE carrier, N is equal to 25), $RSRP_i$ is the RSRP of cell 102 in the $i^{th}$ TTI, and $RSSI_i$ is the RSSI of cell 102 in the $i^{th}$ TTI.

The UE 105 may create a metric in which the measured RSRQs are stored. In one example embodiment, the UE 105 may store the metric on the memory 270 of the UE 105.

In one example embodiment, the TTI duration may be set to 1 m-sec and the UE 105 may repeat S410 for a period of time (e.g., 20 m-sec). The length of 1 m-sec for the TTI duration and the 20 m-sec for the period of time are just examples and may be reconfigured or changed to any other value by a system operator and/or based on empirical studies.

At S420, the UE 105 performs a series of correction processes on the measured quality of $RSRQ_i$s (measured quality of the pilot signal). In one example embodiment, the first correction process is a smoothing of the RSRQs measured by the UE 105 at S410. The UE 105 may apply a smoothing function (e.g., averaging the RSRQs every τ period of time (in one example embodiment, τ may be set to 10-100 m-sec), to the measured RSRQs in order to smooth out fast variations and to visualize the effects of channel-memory and noise smoothing. While a particular example embodiment of the first correction process is described, other known or to be developed methods may be utilized for the smoothing of the RSRQs.

The second correction process may be an introduction of a non-linearity (e.g., 10 log(•) where (•) may be replaced with (RSRQ$_i$)) in order to make variances in the measured RSRQs homogenous (in time). In one example embodiment, the smoothed RSRQs to which the nonlinearity has been applied may be represented as $\overline{RSRQs}$. While a particular example embodiment of the second correction process is described, other known or to be developed methods may be utilized to compensate for the nonlinearities and make variances in the measured RSRQs homogenous.

At S425, the UE 105 predicts a quality of the next RS based on the $\overline{RSRQs}$. In other words, the UE 105 predicts RSRQ$_i$ for i=n+1, n+2, n+3, etc., represented by $\widehat{RSRQ}$s, based on $\overline{RSRQi}$ for i=0, 1, ..., n. In one example embodiment and for determining $\widehat{RSRQ}$s, the UE 105 may run the $\widehat{RSRQ}$s through a known polynomial fit to obtain $\widehat{RSRQ}$s. In one example embodiment, the polynomial fit may have the form of y=f(x), where y is the RSRQ or the $\widehat{RSRQ}$ value for each time index i (x represents the time indices i). The polynomial fit function y=f(x) is used to predict $\widehat{RSRQ}$s (i.e., the value of y for y=f(x), where x=n+1, n+2, n+3, ...). Although a polynomial fit of the form y=f(x) has been described for predicting $\widehat{RSRQ}$s, the prediction of $\widehat{RSRQ}$s is not limited to using the described polynomial fit form but rather may encompass any other known or to be developed polynomial fits and/or other methods according to which a series of measured RSRQ values may be used to predict a future value of RSRQ, represented by $\widehat{RSRQ}$s.

At S427, the UE 105 may apply a smoothing operation to the $\widehat{RSRQ}$s values. In one example embodiment, the smoothing operation may be the same as the first correction process described above at S420. However, other known or to be developed methods for performing the smoothing operation may be utilized.

At S430, the UE 105 obtains a mapping. In one example embodiment, the mapping is function that returns a predicted value of cell 102's throughput for a given measured RSRQ value (e.g., the predicted $\widehat{RSRQ}$ values).

As described above, the predicted $\widehat{RSRQ}$ values may be associated with a different component carrier provided by the eNB 101). Therefore, the mapping is a function that returns an estimated value of cell 101's throughput over a different/second component carrier for the predicted $\widehat{RSRQ}$ values associated with a different component carrier provided by the eNB 101.

In one example embodiment, the UE 105 may obtain the mapping from the currently serving base station, eNB 101-1. Hereinafter, the process of determining the mapping will be described.

The neighboring cell 102's base station 102-1 may create a mapping for various throughputs of the neighboring cell 102 as a function of the neighboring cell's RSRQ. In the example embodiment in which the first and second component carriers are provided by the same serving cell's base station (eNB 101-1), the eNB 101-1 creates the mapping.

The base station 102-1 (or alternatively the eNB 101-1) may create the mapping as follows.

One or more UEs served by the base station 102-1 may receive downlink transmissions from the base station 102-1 (the base station 102-1 may be considered an eNB for purposes of this discussion however, it may encompass other types of base stations belonging to other wireless communications technologies, as discussed above). In the example embodiment in which the first and second component carriers are provided by the same serving cell's base station (eNB 101-1), the one or more UEs are accordingly served by the eNB 101-1.

The one or more UEs in cell 102 may then calculate a Signal-to-Interference and Noise Ratio (SINR) of the received downlink transmissions. The UEs 102 may calculate the SINR by way of embedded pilot tones in the received downlink transmissions.

The one or more UEs in cell 102 may then calculate a Channel Quality Indicator (CQI) based on capacity calculations (for example for Additive White Gaussian Noise (AWGN) channels). The one or more UEs may then transmit the calculated CQI back to the eNB 102-1. The eNB 102-1, upon receiving the CQIs, forms an understanding of the SINRs at the one or more UEs in cell 102.

The eNB 102-1 selects an appropriate Modulation Coding Scheme (MCS) based on eNB 102-1's understanding of the one or more UE's SINR. The MCS may be considered a channel quality driven indicator. In one example embodiment, signal processing capabilities at the UEs in cell 102 may also affect the determination of the MCS by the eNB 102-1, as is known in the art.

Thereafter, the eNB 102-1 obtains the number of Physical Resource Blocks (PRBs) to be allocated to each of the one or more UEs in cell 102 in the next TTI based on cell 102's load and eNB 102-1's scheduler algorithm. In one example embodiment, the number of PRBs may be strictly driven by eNB 102-1's load and Quality of Service (QoS) assignment associated with each of the one or more UEs in cell 102.

Thereafter, using the MCS and the PRB as calculated above, the eNB 102-1 calculates a Transport Block Size (TBS), in number of bits, for transmission to each of the one or more UEs in cell 102 during the next TTI. Determination of the TBS based on MCS and PRB may be done via a lookup table provided in the 3GPP TS 36.213 v. 9.0.0 (2009-12) document, the entire content of which is incorporated herein by reference.

During each TTI, the one or more UEs in cell 102 may measure the RSRQ of cell 102 in the same manner as described above with reference to measuring of the RSRQ of cell 102 by the UE 105 and report it back to the eNB 102-1. Therefore, the eNB 102 may create a metric of the received RSRQ values, as measured by the one or more UEs in cell 102.

Thereafter, for every TTI, each of the one or more UEs served by eNB 102-1 determines a throughput β(i), defined by equation (2) shown below.

$$\beta(i) = \begin{cases} \frac{TBS(i)}{prb(i)}, & \text{if } prb(i) \neq 0 \\ 0, & \text{Otherwise} \end{cases} \quad (2)$$

where β(i) is cell 102's (e.g., neighboring cell to UE 105) throughput in the i$^{th}$ TTI, TBS(i) is the transport block size, as determined by eNB 102-1 discussed above in the i$^{th}$ TTI for each of the one or more UEs in cell 102, and prb(i) is the number of physical resource blocks (PRBs) that is assigned to each of the one more UEs in cell 102 by eNB 102-1 in the i$^{th}$ TTI. In one example embodiment, Prb(i) may be zero for a UE if such UE is scheduled a retransmissions, when such UE is not scheduled for transmission, and/or when a log file for such UE in a given TTI is missing (CQI from the UE is not received at eNB 102-1).

In the end (after the termination of a specified period), the eNB 102-1 may have another metric that includes a series of values for $\beta$ for each TTI(i) during the specified period, as determined by the one or more UEs in cell 102. Thereafter, the eNB 102-1 performs a smoothing operation of the $\beta$ values in a similar manner as the smoothing operation performed by eNB 101-1 on the measured RSRQ values described above with respect to step S420. In one example embodiment and instead of using a period $\tau$ varying between 10 to 100 m-sec, as described above, the eNB 102-1 uses a period $\tau$ that may vary between 50 to 200 m-sec. However, the given numerical values for the period $\tau$, for smoothing of the RSRQ values and the fi values, are just examples and such periods $\tau$, may take on any other value as deemed appropriate by system operator(s) and/or determined based on empirical studies. The non-linearity applied to the smoothed $\beta$ values may be performed in the same manner as discussed above with regard to the measured RSRQ values at step S420.

The smoothed $\beta$ values to which the non-linearity has been applied may be represented as $\bar{\beta}$.

Thereafter, the eNB 102-1 may feed the $\bar{\beta}$ values to a functional learning algorithm executed on the eNB 102-1. The functional learning algorithm may be a non-parametric functional regression technique as described below, which outputs a polynomial (mapping) for determining cell 102's throughput as a function of cell 102's RSRQ. Although an example embodiment is described herein in which a non-parametric functional regression is described for obtaining the mapping for cell 102's throughput, other known and/or to be developed methods and models may also be used to obtain the mapping for cell 102's throughput.

The relationship between an output value $y_i$ (in this case $y_i=\bar{\beta}_i$) and $X_i$ (in this case $X_i=RSRQ_i$), is given by equation (3) below.

$$y_i = r(X_i) + \epsilon_i \qquad (3)$$

where $y_i$ is the throughput of cell 102 during the $i^{th}$ TTI, $r(X_i)$ is as defined below in equation (4), and $\epsilon_i$ is an error value in the $i^{th}$ TTI, that is determined based on empirical studies.

An estimate of $r(X_i)$, represented as $\hat{r}(X_i)$, is given by equation (4) below.

$$\hat{r}(X_i) = \frac{\sum_{i=1}^{n} K(h^{-1}d(X, X_i))y_i}{\sum_{i=1}^{n} K(h^{-1}d(X, X_i))} \qquad (4)$$

where h is a smoothing parameter obtained using known methods, d is a distance metric given by equation (5) below, and K is a triweight Kernel as given by equation (6) below. Furthermore, as assumption is made that there are a total of n TTIs.

$$d(X, X_i) = \sqrt{((X - X_i)^2)} \qquad (5)$$

$$K(u) = \frac{35}{32}(1 - u^2)^2 1_{\{|u| \leq 1\}} \qquad (6)$$

Although equations (5) and (6) provide specific example embodiments of a distance metric and a kernel, respectively, any other known and/or to be developed distance metric and kernels may also be used, in conjunction with and/or instead of that shown in equations (5) and (6), in determining the mapping for cell 102's throughput.

The above described process for determining a functional relationship (mapping) between cell 102's throughput and the RSRQ of cell 102, as measured by one or more UEs operating in cell 102, may then be sent by eNB 102-1 to eNB 101-1 which currently serves the UE 105, via any known signaling and/or method. Thereafter, the UE 105 obtains the mapping from eNB 101-1.

In yet another embodiment, the UE 105 may learn the mapping between the throughput of cell 102 and the RSRQ as observed by a UE in cell 102, during UE's past operation(s) in cell 102. In other words, whenever the UE 105 operates in any of the neighboring cells 102-104, the UE 105 learns that cell's corresponding mapping and stores the same in memory 270 of the UE 105. Thereafter, when the UE 105 is operating in another cell and is performing the process of handing over to one of the previously visited cells, the UE 105 may no longer obtain the target cell's mapping from the eNB 101-1 but rather may use the mapping stored in the memory 270 of the UE 105.

In yet another example embodiment, the mapping for a neighboring cell's throughput may be obtained in laboratory setting and then pre-loaded onto a base station servicing the neighboring cell prior to deployment of the base station into the neighboring cell. The mapping may then be communicated by the base station of the neighboring cell (e.g., eNB 102-1) to a serving base station (e.g., eNB 101-1) of a user equipment (e.g., UE 105) via known and/or to be developed signaling, which may then in turn be provided to the user equipment (e.g., UE 105) by the serving base station (e.g., eNB 101-1).

In one example and in a laboratory setting, a cell's throughput as a function of the cell's RSRQ will be determined for all chancel conditions under which a base station of the neighboring cell operates once deployed. In a heterogeneous network, where radio frequency (RF) technologies, without prior field testing, exists, the laboratory setting may present a suitable option for determining a cell's throughput as a function of the cell's RSRQ.

Referring back to FIG. 4, at S440, the UE 105 predicts a a target throughput (where the target throughput may be that of the neighboring base station 102-1 or the serving base station 101-1 over a different component carrier). Predicting a target throughput (data throughput) may also refer to determining an estimate of a future target throughput associated with the same/different component carrier, base station, etc. In one example embodiment, the UE 105 predicts the target throughput by inputting the $\widetilde{RSRQ}$ s (i.e., the measured values of the RSRQ of cell 102 by the UE 105 when the UE 105 is still operating in cell 1 or the measured values of the RSRQ of cell 101 over a different component carrier) determined at S420, as an input into the obtained mapping and obtains an estimate of the predicted throughput values, $\hat{\beta}$, of cell 102. In other words, the UE 105 inputs $\widetilde{RSRQ}$ s into equation (4) to obtain the values of y (i.e., target predicted throughput $\hat{\beta}$).

At S445, the UE 105 may apply a smoothing operation on the determined predicted values of $\hat{\beta}$. In one example embodiment, the UE 105 may perform the smoothing operation in the same manner as described above with reference to S420. However, any other known or to be developed method for performing the smoothing operation may be utilized.

At S450, the UE 105 determines whether the UE 105 is in a handover region of any additional neighboring/target cells (e.g., any one of cells 103 and cell 104 in addition to cell 102) and/or any other component carriers. If at S450, the UE 105 determines that the UE 105 is in a handover region of one or more additional neighboring/target cells, then at S460, the UE 105 performs S410 to S445 for each additional neighboring/target cell.

At S470 and once the UE 105 completes the prediction of the throughput in each neighboring cell (and/or each component carrier), the UE 105 selects one of neighboring/target cells (e.g., one of cells 102 to 104) having the highest predicted throughput, as the cell (and/or component carrier) to which the UE 105 will switch/handover.

Thereafter, at S480, the UE 105 reports/communicates the predicted/selected target throughput to an application server/TCP stack currently providing data services to the UE 105. The application server/TCP stack may then adjust one or more parameters according to which services are provided by the application server to the UE 105 (e.g., adjust data transmission rate) so as to provide a smooth and uninterrupted service to the UE 105 during the handover of the UE 105 from cell 101 to cell 102. Furthermore and as described above, the neighboring cell's predicted throughput may be communicated to any other network element/application/entity which may utilize the neighboring cell's throughput prediction in performing associated tasks.

However, if at S450, the UE 105 determines that the UE 105 is in a handover region of only one target cell (e.g., cell 102 as described above) then the process proceeds to S480, as described above. Thereafter, the process described in FIG. 4 may end.

In one example embodiment, the process of FIG. 4 may be repeated every time the UE 105 enters a region of handover as indicated by a triggering event. The triggering event may be, for example, when a RSSI and/or RSRP of the neighboring cell, as observed by the UE 105, becomes stronger than a threshold (the threshold may be a design parameter that is configurable and set based on empirical studies).

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A user equipment currently being served over a first component carrier, the user equipment comprising:
a processor configured to,
predict a quality of a pilot signal associated with a second component carrier, the second component carrier being a potential component carrier for a handover of the user equipment,
predict a data throughput based on the predicted quality of the pilot signal, the predicted data throughput being indicative of data throughput experienced by the user equipment after the handover of the user equipment to the second component carrier;
obtain a mapping associated with the second component carrier, the mapping representing the data throughput of the second component carrier as a function of a quality of the pilot signal, and
input the predicted quality of the pilot signal into the mapping, wherein
the processor is configured to predict the data throughput based on the mapping.

2. The user equipment of claim 1, wherein the processor is configured to predict the quality of the pilot signal based on a power and a strength indicator of the pilot signal.

3. The user equipment of claim 1, wherein the processor is configured to
predict a plurality of qualities of the pilot signal,
predict a plurality of data throughputs based on the plurality of qualities of the pilot signal, and
apply a correction process to the predicted plurality of data throughputs to adjust variations among the predicted plurality of data throughputs.

4. The user equipment of claim 1, wherein the mapping is created based on a received quality of the pilot signal, as measured by one or more user equipment served over the second component carrier, a transport block size determined for each of the one or more user equipment served over the second component carrier during a transmission time period, and a number of physical resource blocks allocated to each of the one or more user equipment served over the second component carrier during the transmission period.

5. The user equipment of claim 1, wherein the mapping is created in a laboratory setting and pre-programmed into a base station to be obtained by the user equipment.

6. The user equipment of claim 1, wherein
the mapping has been created by the user equipment during one or more previous operations of the user equipment over the second component carrier, and
the mapping has been stored in a memory of the user equipment.

7. The user equipment of claim 1, wherein the processor is configured to determine whether the user equipment is in a region of handover to two or more component carriers, and
if the processor determines that the user equipment is in the region of handover to the two or more component carriers, the processor is configured to,
predict a quality of a pilot signal associated with each of the two or more component carriers,
predict a data throughput for each of the two or more component carriers based on the predicted quality of the respective pilot signal, the predicted data throughput for each of the two or more component carriers being indicative of data throughput after the handover of the user equipment to the respective one of the two or more component carriers, and
select one of the two or more component carriers having the highest predicted data throughput for handover.

8. The user equipment of claim 1, wherein the processor is further configured to communicate the predicted data throughput to one of an application server or a transmission control protocol (TCP) transmission entity.

9. The user equipment of claim 1, wherein
the first and second component carriers are,
provided by the base station,
associated with a single frequency band or multiple frequency bands, and
associated with different wireless communications technologies, the handover is between,
the first and second component carriers within a single sector of a cell served by the base station, or
the first and second component carriers in adjacent sectors of the cell served by the base station, and
the user equipment is configured to operate according to any one of the different wireless communications technologies.

10. The user equipment of claim 1, wherein
the first and second component carriers are,
   provided by different base stations,
   associated with a single frequency band or different frequency bands, and
   associated with different wireless communications technologies,
the handover is between two adjacent cells, each of the two adjacent cells being serviced by one of the different base stations, and
the user equipment is configured to operate according to any one of the different wireless communications technologies.

11. A user equipment currently being served over a first component carrier, the user equipment comprising:
a processor configured to,
   predict a quality of a pilot signal associated with a second component carrier, the second component carrier being a potential component carrier for a handover of the user equipment, and
   predict a data throughput based on the predicted quality of the pilot signal, the predicted data throughput being indicative of data throughput experienced by the user equipment after the handover of the user equipment to the second component carrier,
   wherein the processor is configured to predict the quality of the pilot signal based on a power and strength indicator of the pilot signal by,
measuring two or more qualities of the pilot signal, each of the two or more qualities being measured during a single transmission time period,
applying at least one correction process to the measured two or more qualities of the pilot signal, and
predicting the quality of the pilot signal based on the two or more qualities of the pilot signal to which the at least one correction process has been applied.

12. A method for a handover of a user equipment currently served over a first component carrier, the method comprising:
   predicting, by the user equipment, a quality of a pilot signal associated with a second component carrier, the second component being a potential component carrier for the handover of the user equipment,
   predicting a data throughput based on the predicted quality of the pilot signal, the predicted data throughput being indicative of data throughput experienced by the user equipment after the handover of the user equipment to the second component carrier;
   obtaining a mapping associated with the second component carrier, the mapping representing the data throughput of the second component carrier as a function of a quality of the pilot signal, and
   inputting the predicted quality of the pilot signal into the mapping for predicting the data throughput, wherein
the predicting the data throughput predicts the data throughput based on the mapping.

13. The method of claim 12, wherein the predicting the quality of the pilot signal predicts the quality of the pilot signal based on a power and a strength indicator of the pilot signal.

14. The method of claim 13, wherein the predicting predicts the quality of the pilot signal by,
   measuring two or more qualities of the pilot signal, each of the two or more qualities being measured during a single transmission time period,
   applying at least one correction process to the measured two or more qualities of the pilot signal, and
   predicting the quality of the pilot signal based on the two or more qualities of the pilot signal to which the at least one correction process has been applied.

15. The method of claim 12, further comprising:
creating the mapping based on a received quality of the pilot signal, as measured by one or more user equipment served over the second component carrier, a transport block size determined for each of the one or more user equipment served over the second component carrier during a transmission time period, and a number of physical resource blocks allocated to each of the one or more user equipment served over the second component carrier during the transmission time period, and
providing the mapping to be obtained by the user equipment.

16. The method of claim 12, wherein
the mapping has been created by the user equipment during one or more previous operations of the user equipment over the second component carrier, and
the mapping has been stored in a memory of the user equipment.

17. The method of claim 12, further comprising:
determining whether the user equipment is in a region of handover to two or more component carriers, and
upon determining that the user equipment is in the region of handover to the two or more component carriers,
   predicting a quality of a pilot signal associated with each of the two or more component carriers,
   predicting a data throughput for each of the two or more component carriers based on the predicted quality of the respective pilot signal, the predicted data throughput for each of the two or more component carriers being indicative of data throughput after the handover of the user equipment to the respective one of the two or more component carriers, and
   selecting one of the two or more component carriers having the highest predicted data throughput for handover.

18. The method of claim 12, further comprising:
communicating the predicted data throughput to one of an application server or a transmission control protocol (TCP) transmission entity.

* * * * *